United States Patent
Lucas et al.

(10) Patent No.: US 10,641,075 B2
(45) Date of Patent: May 5, 2020

(54) INCREASING HYDRATION TIME OF HIGH CONCENTRATION GELS

(71) Applicant: Halliburton Energy Services, Inc., Houston, TX (US)

(72) Inventors: Bryan Chapman Lucas, Duncan, OK (US); Chad Adam Fisher, Cache, OK (US); Wesley John Warren, Marlow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/318,593

(22) PCT Filed: Sep. 28, 2016

(86) PCT No.: PCT/US2016/054114
§ 371 (c)(1),
(2) Date: Jan. 17, 2019

(87) PCT Pub. No.: WO2018/063180
PCT Pub. Date: Apr. 5, 2010

(65) Prior Publication Data
US 2019/0249535 A1    Aug. 15, 2019

(51) Int. Cl.
*E21B 43/26* (2006.01)
*C09K 8/62* (2006.01)
*C09K 8/68* (2006.01)
*E21B 43/267* (2006.01)
*C09K 8/70* (2006.01)

(52) U.S. Cl.
CPC ............. *E21B 43/267* (2013.01); *C09K 8/62* (2013.01); *C09K 8/70* (2013.01)

(58) Field of Classification Search
CPC ........ E21B 43/26; E21B 43/04; E21B 21/062; E21B 33/138; C09K 8/512; C09K 8/68; C09K 8/685; C09K 8/90; C09K 2208/26
See application file for complete search history.

(56) References Cited

U.S. PATENT DOCUMENTS

| | | |
|---|---|---|
| 5,103,908 A | 4/1992 | Allen |
| 5,190,374 A | 3/1993 | Harms et al. |
| 6,817,376 B2 | 11/2004 | Morgan et al. |
| 7,104,328 B2 | 9/2006 | Phillippi et al. |
| 8,641,266 B2 | 2/2014 | McIntire |
| 2010/0246318 A1 | 9/2010 | Kholy et al. |
| 2014/0364344 A1 | 12/2014 | Weinstein et al. |
| 2015/0133348 A1 | 5/2015 | Oldham |

FOREIGN PATENT DOCUMENTS

| | | |
|---|---|---|
| WO | 2015175481 A1 | 11/2015 |
| WO | 2018063180 A1 | 4/2018 |

*Primary Examiner* — Zakiya W Bates
(74) *Attorney, Agent, or Firm* — John W. Wustenberg; Parker Justiss, P.C.

(57) ABSTRACT

A system and method of increasing hydration time of a high concentration gelled fluid used in a fracturing fluid that uses multiple hydration tanks whose volumes are isolated from one another to provide a continuous batch of hydrated gel having improved hydration and viscosity.

20 Claims, 7 Drawing Sheets

INCREASING HYDRATION TIME OF HIGH CONCENTRATION GELS

CROSS-REFERENCE TO RELATED APPLICATION

This application is the National Stage of, and therefore claims the benefit of, International Application No. PCT/US2016/054114 filed on Sep. 28, 2016, entitled "INCREASING HYDRATION TIME OF HIGH CONCENTRATION GELS," which was published in English under International Publication Number WO 2018/063180 on Apr. 5, 2018. The above application is commonly assigned with this National Stage application and is incorporated herein by reference in its entirety.

BACKGROUND

Hydraulic fracturing is a well known process of pumping a fracturing or "fracing" fluid into a wellbore at an injection rate that is too high for the formation to accept without breaking. During injection the resistance to flow in the formation increases, the pressure in the wellbore increases to a value called the break-down pressure, that is the sum of the in-situ compressive stress and the strength of the formation. Once the formation "breaks down," a fracture is formed, and the injected fluid flows through it. From a limited group of active perforations, ideally a single, vertical fracture is created that propagates in two "wings" being 180° apart and identical in shape and size. In naturally fractured or cleated formations, it is possible that multiple fractures are created and/or the two wings evolve in a tree-like pattern with increasing number of branches away from the injection point.

Fluid not containing any solid (called the "pad") is injected first, until the fracture is wide enough to accept a propping agent. The purpose of the propping agent is to keep apart the fracture surfaces once the pumping operation ceases, the pressure in the fracture decreases below the compressive in-situ stress trying to close the fracture. In deep reservoirs, man-made ceramic beads are used to hold open or "prop" the fracture. In shallower reservoirs, sand is normally used as the propping agent.

Typically fracturing fluids used for well stimulations consist primarily of water but also include a variety of well known additives, such as a hydrated gel that is used for carrying the proppant and other components that allow the fracturing fluid and the proppant to be pumped to a target zone at a high rate and reduced pressure. The gel is hydrated prior to being introduced into the fracturing fluid system. The gel's hydration is sufficient to give it adequate viscosity to support the proppant during the injection process. The treatment design generally requires the fluid to reach maximum viscosity as it enters the fracture. The gelation or viscosifying of polymers and/or surfactants in the fracturing fluid typically obtains the requisite viscosity. The selection of additives is based on a number of factors including the makeup of the formation, formation fluids, pumping configurations, and borehole temperatures without breaking down.

BRIEF DESCRIPTION

Reference is now made to the following descriptions taken in conjunction with the accompanying drawings, in which.

DETAILED DESCRIPTION

Figure 1:
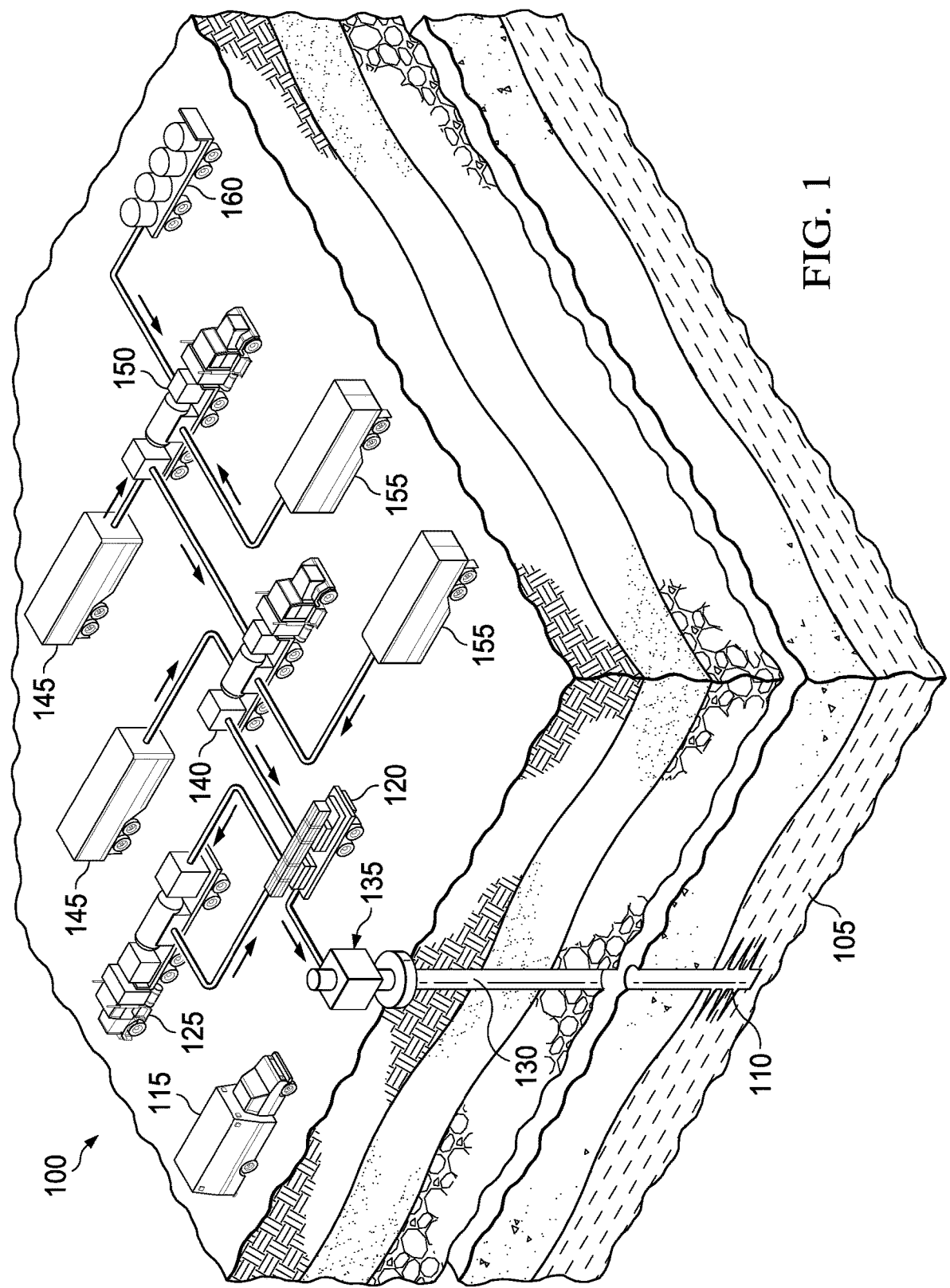
FIG. 1 illustrates a conventional well completion system in which the method and apparatus of this disclosure may be used.

Fracturing fluids are often an integral part of a completion operation and have become even more so in view of advancements in drilling techniques that have led to large production capabilities of oil shales. Service companies can tailor or design the fracturing fluids for any given fracturing application. As mentioned above, fracturing fluids typically include a hydrated gel that is used to carry the proppant into the fractures of the targeted zone. A consistent high viscosity of the hydrated gel is very desirable, as it insures a consistent delivery of proppant to the fractures zone. Low viscosity of the hydrated gel may cause the proppant to fall out of the fracturing solution, thereby decreasing the fracturing fluid's efficiency or reducing fracture width. Either or both of these conditions contribute to "screen outs", which can end operations until the wellbore is flushed out.

Current "continuous hydration" processes are used to hydrate the gel. Such hydration systems comprise a single tank that has weirs, baffles, or a deflector plate installed to create a torturous path that is intended to create a first-in-first-out (FIFO) flow through the tank. When the gel concentration and flow rate through the tank is low enough, this system works, and an adequately hydrated gel is deliverable to the fracturing solution. However, as downhole pump rates increase, the hydration time within the tank decreases. To combat this and slow the flow rate through the hydration tank, the gel concentration in the hydration tank is typically increased. As the gel concentration increases, the dilution ratio for a given downhole viscosity also increases, which results in a lower flow rate and increased residence time in the tank. However, the viscosity difference between the inlet and exit increases as gel concentration increases, which reduces the viscosity consistency of the hydrated gel.

As discussed in more detail below, test results show that in conventional "continuous hydration" processes, the hydration of the gel becomes very inefficient when trying to make a heavy concentrate of the gel and water. The thinner, lighter viscosity younger gel cuts through the thicker, heavier viscosity older gel and short circuits the hydration tank and causes channeling, which disrupts the FIFO process. As a result, the concentrated gel that leaves the hydration tank and the downhole blender is not fully hydrated. This requires more gel to be added to the concentrate in order to achieve the desired viscosity, but as noted above, increasing the concentration of the gel presents its own problems.

This disclosure, in its various embodiments, provides a system and method that addresses the problems associated with conventional gel hydration processes by increasing the consistency of the gel's viscosity using separate hydration tanks whose volumes are isolated from one another. These separate hydration tanks create a truer FIFO system, which maximizes hydration time of the gel. As used herein and in the claims, "isolated" means that the fluids within the respective tanks do not mix between their collective volumes.

In the drawings and descriptions that follow, like parts are typically marked throughout the specification and drawings with the same reference numerals, respectively. The drawn figures are not necessarily to scale. Certain features of this disclosure may be shown exaggerated in scale or in somewhat schematic form and some details of conventional elements may not be shown in the interest of clarity and conciseness. Specific embodiments are described in detail and are shown in the drawings; with the understanding that they serve as examples and that, they do not limit the disclosure to only the illustrated embodiments. Moreover, it is fully recognized that the different teachings of the embodiments discussed, below, may be employed separately or in any suitable combination to produce desired results.

Unless otherwise specified, any use of any form of the terms "connect," "engage," "couple," "attach," or any other term describing an interaction between elements is not meant to limit the interaction to direct interaction between the elements but include indirect connection or interaction between the elements described, as well. As used herein and in the claims, the phrases, including grammatical variations thereof, "fluidly connected" or "fluidly coupled" mean that the recited elements are directly or indirectly connected together by a conduit system through which a fluid, such as a gel solution may be transported. The conduit system may include intervening components, such as pumps or fluid valves. Moreover, the connection or coupling does not have to be a joined connection or coupling. For example, in certain embodiments, the conduit may include an open end (such as in a faucet or spout) that does not contact the tank but allows the hydrated gel to openly empty into the tank. Additionally, as used herein and in the claims, "operatively connected" means that the recited elements are connected either directly or indirectly in a manner that allows the stated function to be accomplished. This term also includes the requisite physical structure in the recited structure that is necessary to accomplish the stated function. For example, regarding electrical components, the recited elements may be connected directly by hardware or may be connected wirelessly and have the electrical components, programmed or programmable microprocessors and memory necessary to accomplished the stated connection.

In the following discussion and in the claims, the terms "including" and "comprising" are used in an open-ended fashion, and thus should be interpreted to mean "including, but not limited to." References to "downstream" mean towards the slurry mixer or toward the wellhead. The term "zone" or "pay zone," as used herein, refers to separate parts of the wellbore designated for treatment or production and may refer to an entire hydrocarbon formation or separate portions of a single formation such as horizontally and/or vertically spaced portions of the same formation. Further, any references to "first," "second," etc. do not specify a preferred order of method or importance, unless otherwise specifically stated, but such terms are intended to distinguish one element from another. For example, a first element could be termed a second element, and, similarly, a second element could be termed a first element, without departing from the scope of example embodiments. Moreover, a first element and second element may be implemented by a single element able to provide the necessary functionality of separate first and second elements.

The various characteristics mentioned above, as well as other features and characteristics described in more detail below, will be readily apparent to those skilled in the art with the aid of this disclosure upon reading the following detailed description of the embodiments, and by referring to the accompanying drawings.

FIG. 1 illustrates a conventional well completion system 100 in which the method and apparatus of this disclosure may be used. Once a payzone 105 is identified or reached, a conventional fracturing operation may be used to create fractures 110 in the payzone 105 to increase its porosity for the purpose of increasing oil or gas production. Such completion environments 100 include, among other units, an operations control unit 115, a manifold unit 120, a frac pump 125, a wellbore 130, capped by a wellhead tree 135. The fracturing system also comprises a slurry blender system 140 where the hydrated gel is combined with the other fracturing additives and proppant. The slurry blender system 140 comprises one or more of the following: fluid tanks 145, a gel blender 150, and other fracing component storage tanks 155, such as chemical and sand storage tanks. The gel hydration apparatus 160, as provided herein, is couplable (i.e. can be coupled to) the slurry blender system 140. As seen in the embodiment of FIG. 1, the gel hydration apparatus 160 includes two or more separate hydration tanks that can be transported on a platform to the completion cite. The gel hydration apparatus 160 also includes pumps used to pump the hydrated gel to the slurry blender system 150. As the payzone 105 is fractured, the hydrated gel is pumped along with a proppant into the fractures 110 to prop the fissures open, thereby, effectively increasing its porosity.

Figure 2A:
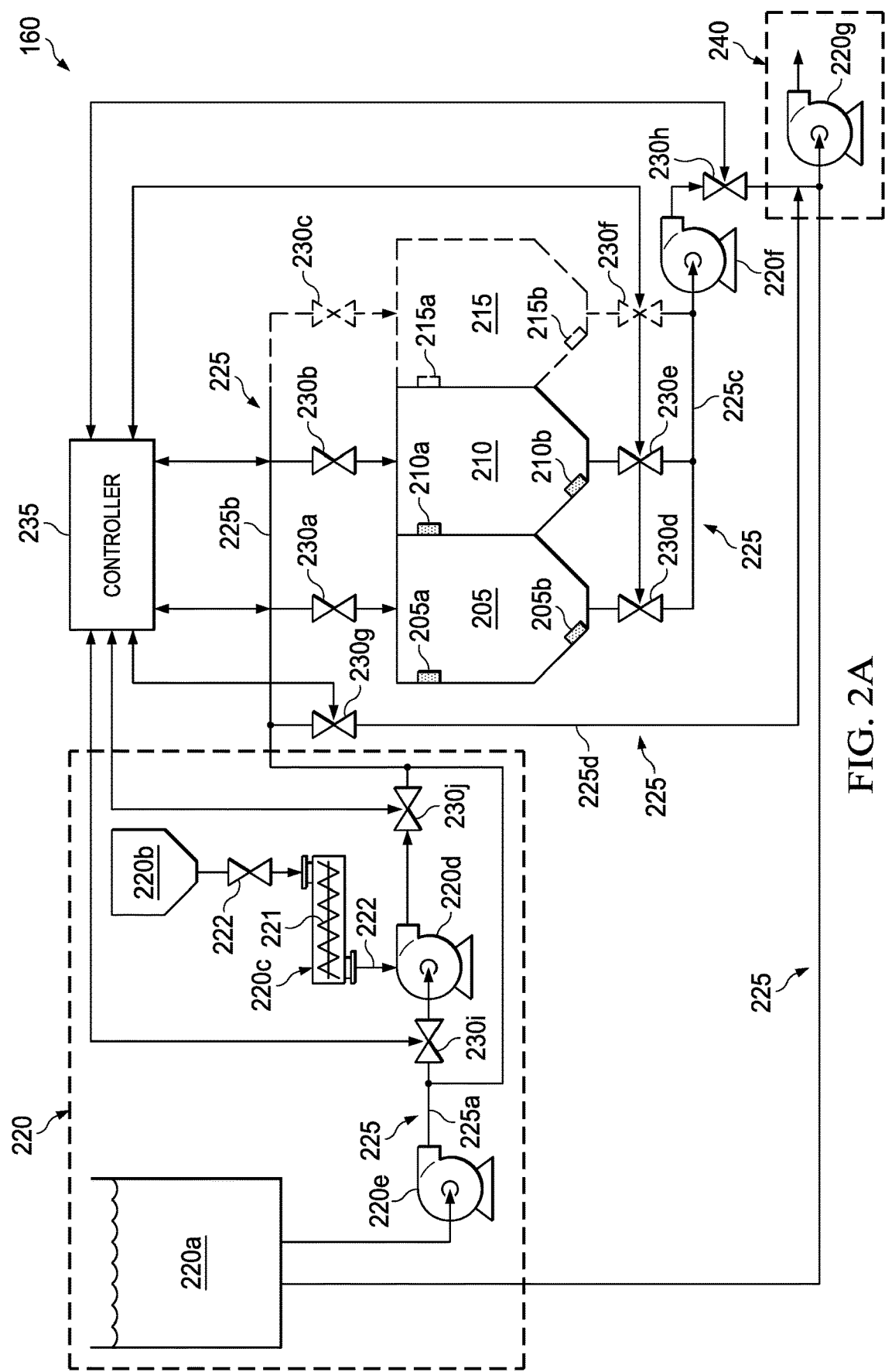
FIG. 2A illustrates a more detailed, schematic view of an embodiment of the gel hydration apparatus, as presented herein.

FIG. 2A illustrates a more detailed, schematic view of an embodiment of the gel hydration apparatus 160, as presented herein. This embodiment presents a "continuous batch" hydration system comprised of at least two hydration tanks 205 and 210, with hydration tank 215, shown in dashed lines, being one of one or more optional hydration tanks that might also be present. The hydration tanks 205-215 each have an interior volume that is isolated from the other. As noted above, this means that the separate volumes are not connected to each other such that the hydrated gel moves from one tank to the other within their collective volumes. This is in contrast to conventional hydration tanks that have several compartments with a series of weirs or baffles between them that allow the hydrated gel to flow from one compartment to another during the hydration process. In the illustrated embodiment, the hydrated gel within each tank remains separated from one another until pumped downstream to a slurry blend, not shown. Other embodiments may include one or more of the optional hydration tanks 215, shown in dashed lines that can serve has a holding tank. In certain embodiments, the hydration tanks 205-215 also include filled sensors 205a, 210a, and 215a and emptied sensors 205b, 210b, and 215b. These sensors are configured to provide a signal when the respective tank is filled or empty.

This embodiment further includes a gel supply system 220 that is fluidly connected to the hydration tanks 205, 210, and optional hydration tank 215 by a conduit system 225.

The conduit system 225 may be a conventional pipe system that allows the gel solution to be pumped from the gel supply system 220 to the hydration tanks 205, 210, or 215. The conduit system 225 may be comprised of connected subsections of conduits 225a-225d, as explained, below that create different flow paths through the conduit system 225. In an embodiment, the hydration tanks 205, 210, or 215 may have a top cover (not shown).

In such embodiments, the conduit system 225 may physically join or connect to each of the hydrations tanks 205, 210, or 215. In another embodiment, however, the hydration tanks may have an open configuration, as shown. In such embodiments, the conduit system 225 may terminate just above the hydration tanks 205, 210, or 215 and empty into them in a faucet or spout like fashion as shown. Additional embodiments may be included to ensure the gel is layered in the selected hydration tank (oldest gel at the bottom and youngest gel at the top of the tank). In an embodiment, the gel supply system 220 includes a water tank 220a, a gel supply bin 220b, which dumps the gel into a gel feeder 220c. The gel supply bin 220b may include one or more conventional load sensors that measure the amount of gel powder by weight contained in the gel supply bin 220b. This information is used to indicate how much of the gel powder is metered out of the gel supply bin 220b.

The gel feeder 220c, which may be of conventional design has a conveyor mechanism, such as an auger or screw 221 that meters the gel powder and is located adjacent an outlet of the gel supply bin 220b. A conventional valve 222 may be located near the outlet of the gel supply bin 220b to deliver a quantity of the gel powder to the gel feeder 220c meters the gel powder into the gel mixer 220d and may also disperse or grind the gel powder to minimize hydration time. This embodiment further includes a water pump 220e that pumps water from the water tank 220a to the gel mixer 220d and to the hydration tanks 205, 210, or 215, and hydrated gel pump 220f located downstream of the hydration tanks 205, 210 or 215. The gel hydration apparatus 200 is couplable to a blender system pump 220g that forms a part of a slurry blender system 240, as discussed above.

A number of known gels can be used in the embodiments described herein that have the capability of mixing and hydrating multiple different types of dry additives. The hydration systems incorporate the capacity to calibrate feeders to meter a variety of dry powders. The gel powders may be viscosifying agents such as synthetic or natural polymers. Hydratable polymers include those containing one or more functional groups, such as a hydroxyl, carboxyl, sulfate, sulfonate, amino or amid group. In some embodiments, the gel powder includes polysaccharides, polyvinyl alcohols, polyacrylates (including the (meth)acrylates), polypyrrolidones, polyacrylamides (including (meth)acrylamides) as well as 2-acrylamido-2-methylpropane sulfonate and mixtures thereof. Other suitable polysaccharides and derivatives are those which contain one or more monosaccharide units of galactose, fructose, mannose, glucoside, glucose, xylose, arabinose, glucuronic acid and pyranosyl sulfate. These include guar gums and derivatives thereof, locust bean gum, tara, xanthan, succinoglycan, scleroglucan and carrageenan. Preferred viscosifying polymers may include crosslinkable polysaccharides, such as guar gums and derivatives, cellulose, starch, and galactomannan gums. Cellulose and cellulose derivatives include alkylcellulose, hydroxyalkyl cellulose or alkylhydroxyalkyl cellulose, carboxyalkyl cellulose derivatives such as methyl cellulose, hydroxyethyl cellulose, hydroxypropyl cellulose, hydroxybutyl cellulose, hydroxyethylmethyl cellulose, hydroxypropylmethyl cellulose, hydroxybutylmethyl cellulose, methylhydroxyethyl cellulose, methylhydroxypropyl cellulose, ethylhydroxyethyl cellulose, carboxyethylcellulose, carboxymethylcellulose and carboxymethylhydroxyethyl cellulose. Specific examples of polysaccharides useful in the embodiments disclosed herein include, but are not limited to, guar gum, hydroxypropyl guar, carboxymethylhydroxypropyl guar and known derivatives of these gums.

The gel hydration apparatus 200 further comprises a plurality of conventional fluid valves 230a-230j, such as conventional fill/bypass valves, interposed the gel solution conduit system 225. These fluid valves 230a-230j and the other components of the gel hydration apparatus 200 discussed above can be controlled or operated in a sequential manner to allow a flow of hydrated gel through the hydration apparatus 200. In an embodiment, the fluid valves 230a-230j are operatively connected to a controller 235. The connection may be through hardwire, or the fluid valves 230a-230j and controller 235 may include conventional wireless communication circuits, processors, memory, and accompanying circuitry that allow the devices to communicate with each other. Additionally, the controller 235 or the fluid valves 230a-230j include microprocessors and memory that can be programmed with software to provide the instructional commands to operate the fluid valves 230a-230j and the other components of the gel hydration apparatus 200. In this embodiment, the controller 235 is configured to provide respective commands to the fluid valves 230a-330c and 230d-230f to fill and empty the hydration tanks 205, 210, or 215 in a sequential manner as described below. As used herein and in the claims, "configured" means that the recited components have the necessary physical structure or design to perform the stated function. For example, as noted above, in an embodiment, the controller 235 includes one or more programmed or programmable microprocessors and memory to provide instructional commands to the fluid valves 230a-230j, components 220a-220f, as well as other components associated with the gel hydration apparatus 200. In another embodiment, the controller 235 may be a command console that provides visual signals to an operator, who may then manually activate, including by remote means, the various components in the desired sequential manner to hydrate and process the gel.

The hydration system 200 provides a "continuous batch" hydration system comprising at least two or more hydration tanks, 205-215. In a general description of this continuous batch process, young gel is pumped into one of the hydration tanks 205-215 until the tank is filled. At this point, the full tank becomes a static or holding tank where the gel is allowed to hydrate before flow from the tank is initiated. While fluid remains static in one or more holding tanks, aged gel is pumped from an additional tank (work tank) to supply hydrated gel concentrate to the fracturing gel blending process. When the work tank empties, the holding tank with the oldest fluid becomes the work tank, and the previous work tank serves as a holding tank and is rapidly filled with the gelled fluid leaving the gel mixer 220d. In this manner, hydrated gel is continuously supplied from the hydration system 200 by cyclically switching which tank serves as the work tank and which tank(s) serve as the holding tank(s).

To ensure that a flow path is always available for the gel supply solution and the hydrated gel solution, the tank fill/bypass fluid valves, for example 230a-230b, are sequenced to ensure that valve 230b opens before valve 230a closes. The discharge valves, for example 230d-230e, can be sequenced in a similar manner.

The flow rate of the new gel filling the holding tank is set to a constant and high rate, which is higher than the flow rate from the work tank, to fill the holding tank quickly and maximize the hydration time for the youngest fluid entering the holding tank. The fluid fills the holding tank from bottom to top; stacking the fluid in this manner ensures that the oldest fluid discharges first and further enhancing the FIFO flow.

One potential result of filling the holding tank faster than the discharge rate from the work tank is that the water pump 220e, the gel mixer 220d and the gel feeder 220c have to constantly be started and stopped. Further, over time gel accumulates or builds up in the gel mixer 220d, which decreases its efficiency. This can be hard on the equipment and can make metering difficult; however, embodiments disclosed herein address this issue. Once the holding tank is full, the supply of dry gel to the mixer is stopped. However, water continues to be pumped through the gel mixer 220d but bypasses the hydration tanks 205 and 210 through bypass valve 230g and bypass conduit 225d, which carries the wash water to the slurry blender pump 220g. As shown below, when compared to a conventional hydration process, the continuous batch process, as provided herein, has less difference in viscosity between the oldest and youngest fluid in the work tank. This decreased differential viscosity results in the fluid flowing in a more FIFO manner, thereby decreasing channeling of the thin fluid through the thicker fluid, resulting in increased hydration efficiency.

Figure 2B:
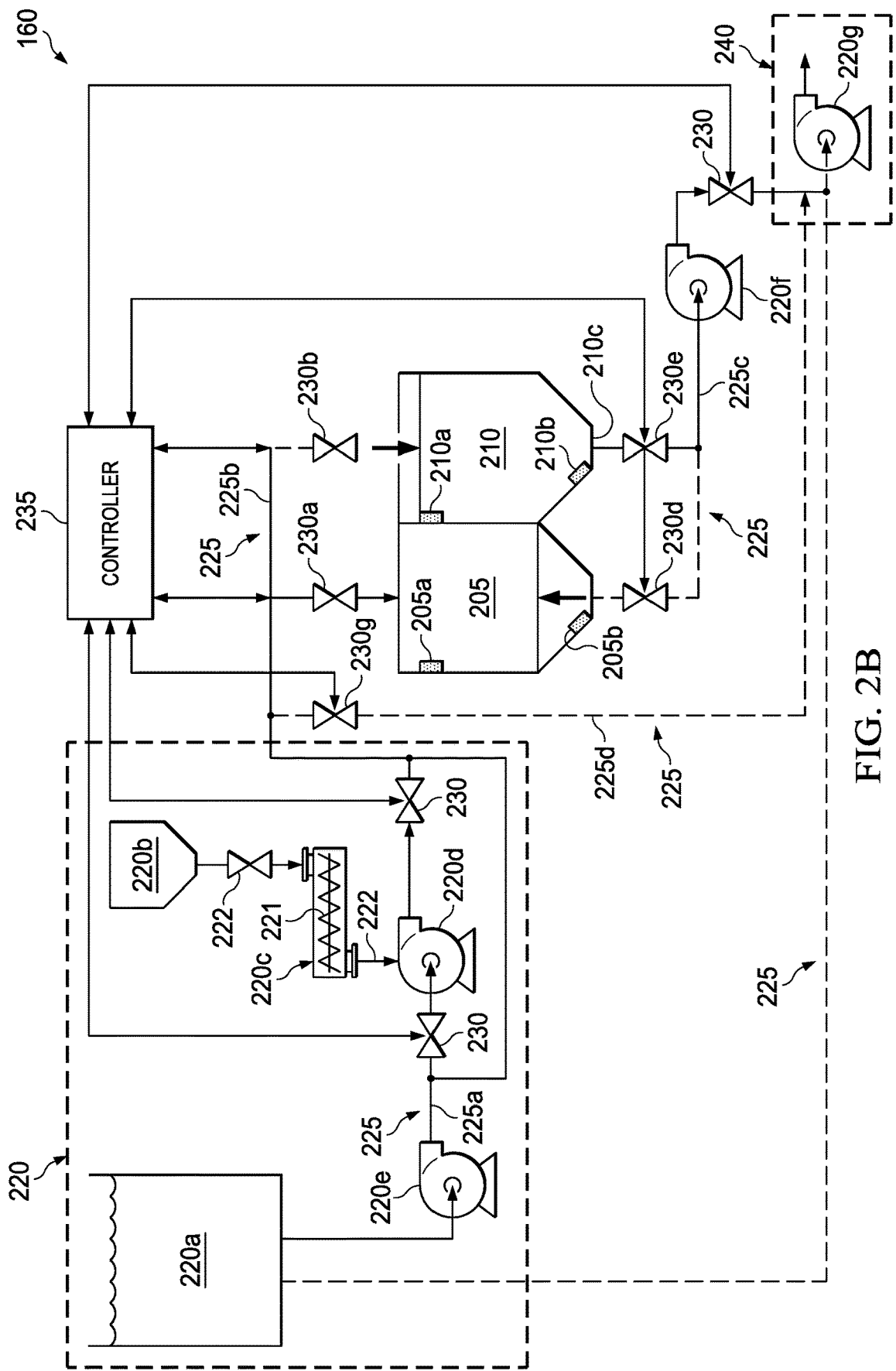
FIG. 2B illustrates an embodiment in a stage of hydrating a gel where hydration tank is being emptied or discharged, while hydration tank is being filled.

FIG. 2B illustrates an embodiment in a stage of hydrating a gel where hydration tank 210 is being emptied or discharged, while hydration tank 205 is being filled. The process initially starts with filling one of the two hydration tanks 205, 210, which will serve as the holding tank while being filled. The controller 235 signals the valve 222 to meter a flow of gel powder from the gel supply bin 220b to the gel feeder 220c. The gel feeder dispenses gel powder into the gel mixer 220d. Water is pumped from the water tank 220a by pump 220e through water supply conduit 225a to the gel mixer 220d to produce a gel solution. The gel solution is pumped through hydration tank conduit 225b into the selected hydration tank, such as hydration tank 210, until the fill sensor 210a signals the controller 235 that the tank is full. Because the hydration tank 210 is filled from the bottom up, residence time of the gel is increased, thereby significantly improving hydration when compared to conventional processes.

When hydration tank 210a is filled, the controller 235 closes valve 230b, as indicated by the dashed line leading to valve 230b, and opens valve 230a, as indicated by solid line leading to valve 230a, to begin filling hydration tank 205. In an embodiment, these valves should be sequenced so that valve 230a opens before valve 230b closes, to insure an open flow path for the fluid. At this point, hydration tank 210 becomes the working tank, and hydration tank 205 is the holding tank. As hydration tank 205 is being filled, as indicated by the directional arrow, the controller 235 signals valve 230e, which is located adjacent the outlet 210c of hydration tank 210, to open, allowing hydration tank 210 to be discharged, as indicated by the directional arrow. The hydrated gel is pumped by hydrated gel pump 220f through outlet conduit system 225c and to slurry blender pump 220g. The gel concentrate is metered by throttling valve 230 and diluted with water at the inlet of the slurry blender pump to provide the desired ratio of gel concentrate to water. The hydrated gel is pumped from slurry blender pump 220g to the slurry blender system 240 where it is blended with proppant and other additives in a mixer and is then boosted to the high pressure frac pump used to fracture the formation.

Figure 2C:
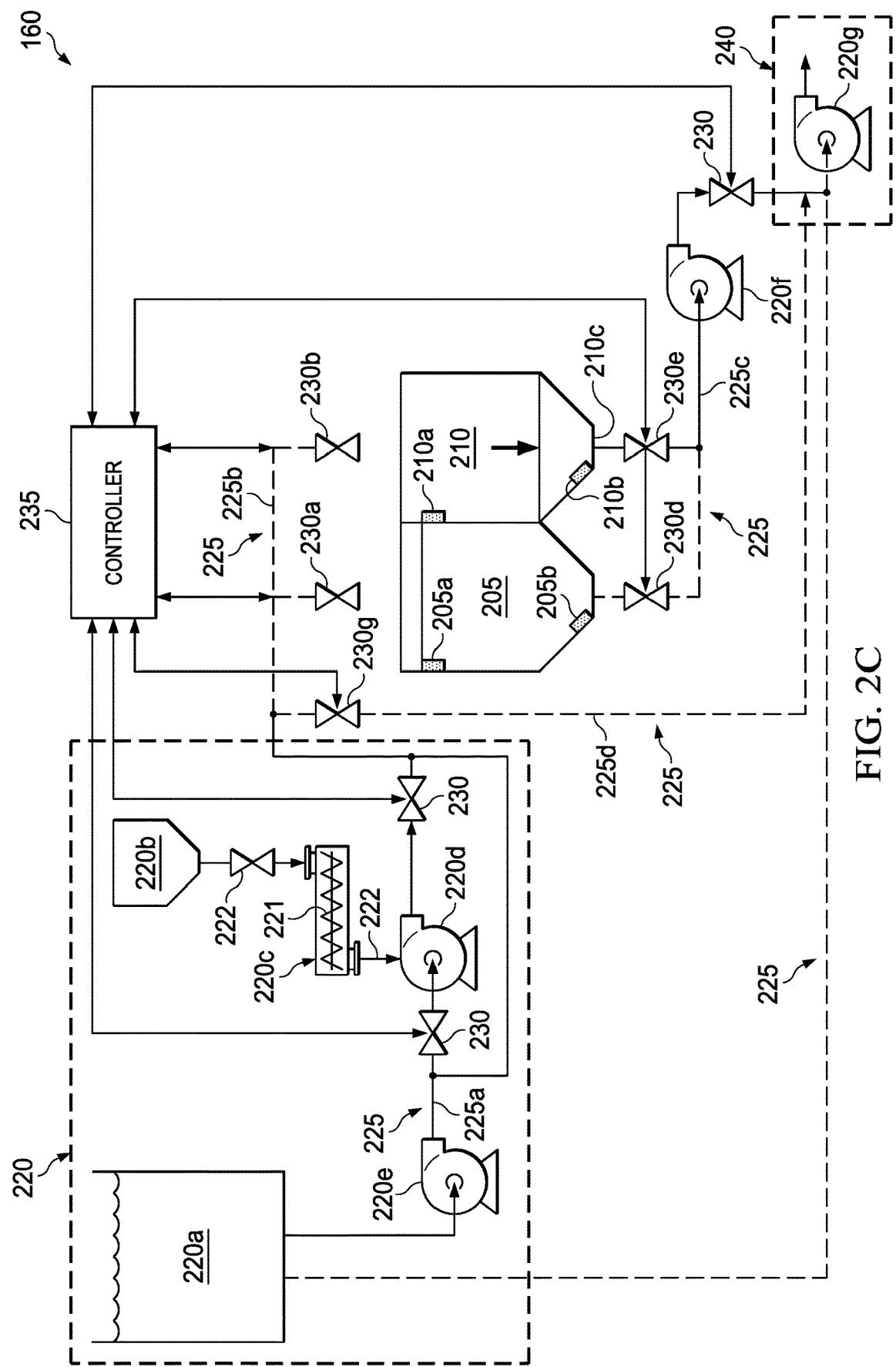
FIG. 2C illustrates an embodiment of the hydration process where hydration tank is being discharged, hydration tank is full and the gel feeder is stopped.

FIG. 2C illustrates an embodiment of the hydration process where hydration tank 210 is being discharged, hydration tank 205 is full and the gel feeder 221 is stopped. As noted above, in a continuous batch process, as presented by the embodiments herein, gel builds up in the gel mixer 220d, which decreases the gel mixer's 220d performance. In the embodiment of FIG. 2C, the controller 235 may signal a cleaning cycle for the gel mixer 220d. In such instances, the controller 235 stops the gel feeder 221 and opens bypass valve 230g. Water is pumped through the gel mixer 220d, even as hydration tank 210 is being emptied. This allows the water to clean the gel buildup out of the gel mixer 220d without stopping the gel delivery process. The water is pumped through the gel mixer 220d, through bypass valve 230g and bypass conduit 225d and to the slurry blender system 240. It should be noted that water from the water tank 220a can be pumped through conduit 225e at any time to provide a flow of water to the slurry blender system 240. In such instances, for example, valve 230a and 230b should both be closed and valve 230g should be opened right before sensor 210b is signaled for a bypass operation. Then valve 230g closes and valve 230b opens.

Figure 2D:
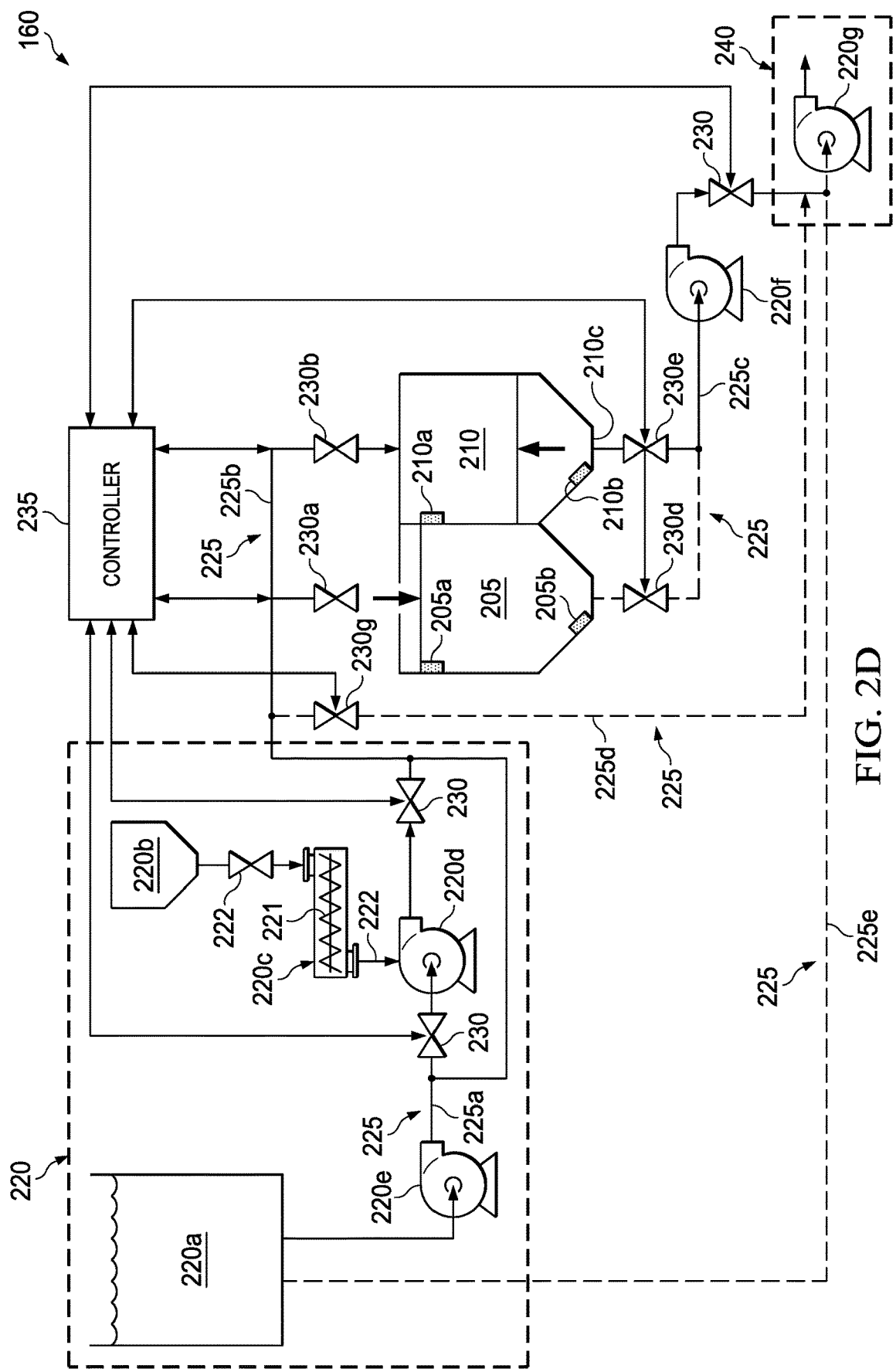
FIG. 2D illustrates an embodiment where hydration tank is being discharged and hydration tank is being filled.

FIG. 2D illustrates and embodiment where hydration tank 205 is being discharged and hydration tank 210 is being filled. When the empty sensor 210b signals the controller 235 that the hydration tank 210 is empty, the controller closes valve 230a and opens valve 230b to allow the hydrated gel to enter hydration tank 210. At this time, hydration tank 205 is full, as indicated by filled sensor 205a and becomes the working tank. The controller 235 signals the valve 230d located adjacent outlet 205c, to open thereby, allowing hydration tank 205 to be discharged. The hydrated gel is pumped by hydrated gel pump 220f through outlet conduit system 225c and to slurry blender system 240 via slurry blender pump 220g. Valve 230 is throttled to meter the correct ratio of gel concentrate to the water supply by conduit 225e. The slurry blender pump 220g pumps the diluted hydrated gel to a mixer where it is mixed with the proppant and other fracturing solution constituents. The processes of FIGS. 2B, 2C, and 2D repeat to provide a constant flow of hydrated gel to system.

EXAMPLES

Figure 3:
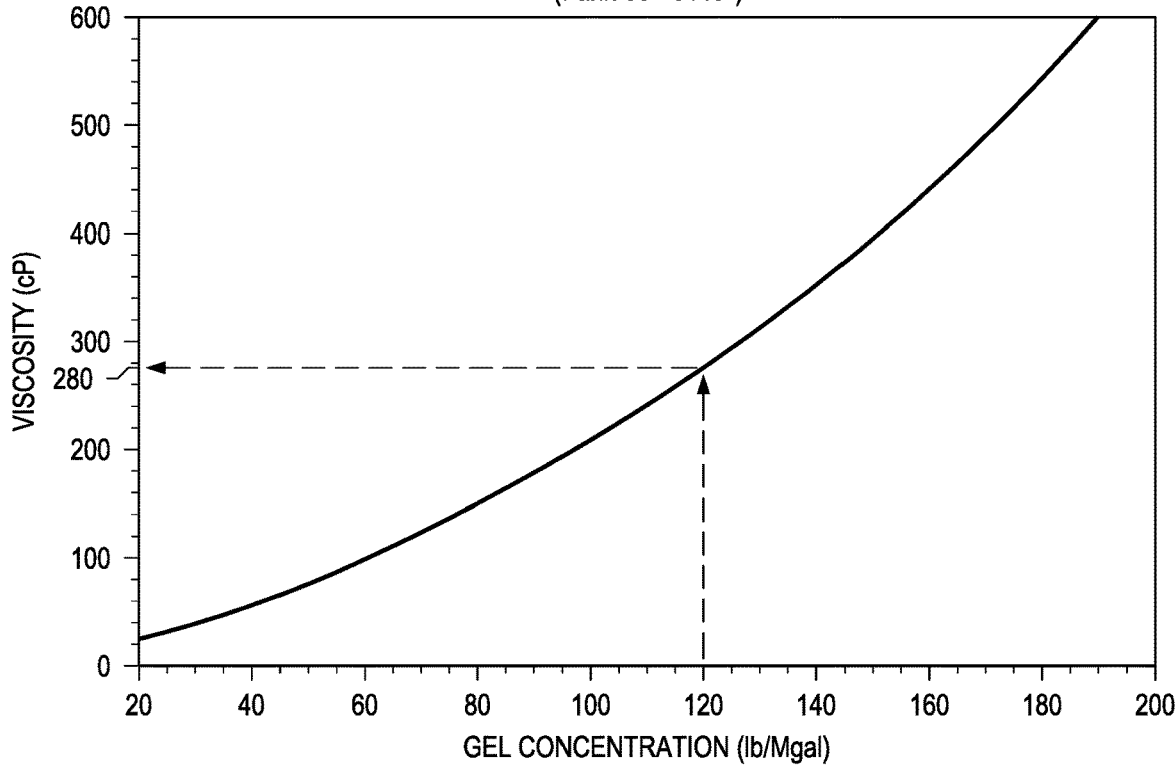
FIG. 3 illustrates a graph depicting the final fully hydrated viscosity for the concentration.

Examples follow to compare the traditional continuous frac gel hydration process, as used on a continuous hydration process, to the proposed "continuous batch" process, as presented herein. All examples were based on mixing a 120 lb/Mgal (thousand gallons) concentrate of a commercially available guar gum gel. The initial viscosity for the hydrated gel at time zero (when exiting the dry gel mixer) was around 10-20 cP. The final fully hydrated viscosity for this concentration was 280 cP, as shown in FIG. 3. The discharge rate from each hydration system was 20 bpm. All tanks in the examples were sized at 70 bbl in the comparative example and the first example. In the second example, the total tank volume was the same as in example 2 but subdivided into three tanks instead of two tanks.

Comparative Example—Standard Continuous Hydration Process

Figure 6:
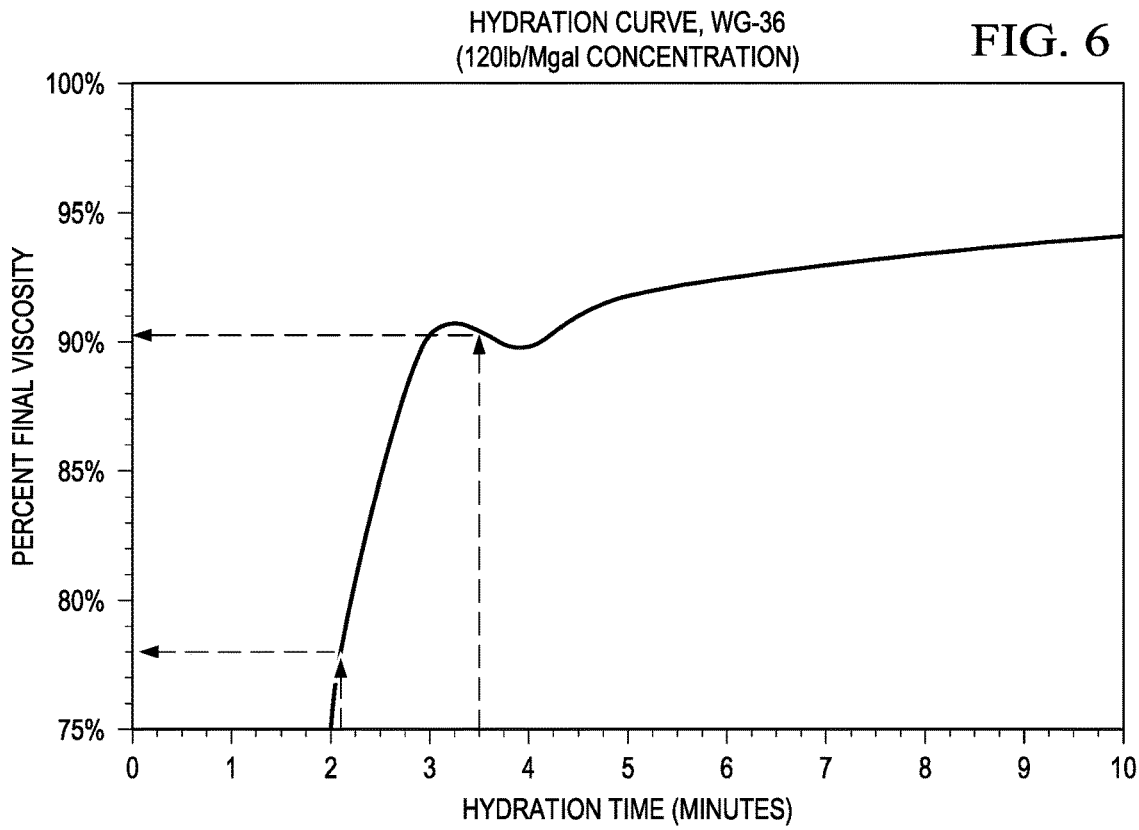
FIG. 6 illustrates a graph depicting the different in viscosity between entering and exiting hydrated get.

The assumption was made that the hydration tank was 100% efficient in producing FIFO flow. Under this assumption, the exiting fluid would age 3.5 minutes (70 bbl divided by 20 bpm). The exiting gel at an age of 3.5 minutes would reach 90% of a final viscosity of 250 cP, as shown in FIG. 6. The gel entering the tank would have a viscosity of 10-20 cP, giving a differential in viscosity between entering and exiting fluid of approximately 235 cP. Based on these observations, it is believed that the young, low viscosity gel entering the tank channeled through the more viscous aged hydrated gel, greatly reducing the plug flow efficiency of the tank. Based on testing, the conventional hydration tank was only 44% efficient in producing FIFO flow when 85 lb/Mgal-(lb/thousand gallons) of commercially available guar gum was mixed at a rate of 10 bpm. Given that this example has both a higher flow rate and higher gel concentration, it is surmised that the tank efficiency would be even lower than 44%. Results of a calculated scenario are shown in Table 1 below:

TABLE I

| | |
|---|---|
| Tank Volume | 70 bbl |
| Gel Concentration | 120 lb/Mgal |
| Fill Rate | 20 bpm |
| Discharge Rate | 20 bpm |
| Dwell Time | 3.5 min. |
| Young Fluid Viscosity (0 minutes) | 10-20 cP |
| Aged Fluid Viscosity (3.5 minutes) | 250 cP |
| Viscosity Differential | ~235 cP |

Example 1: Proposed Continuous Batch Hydration Process

Figure 4:
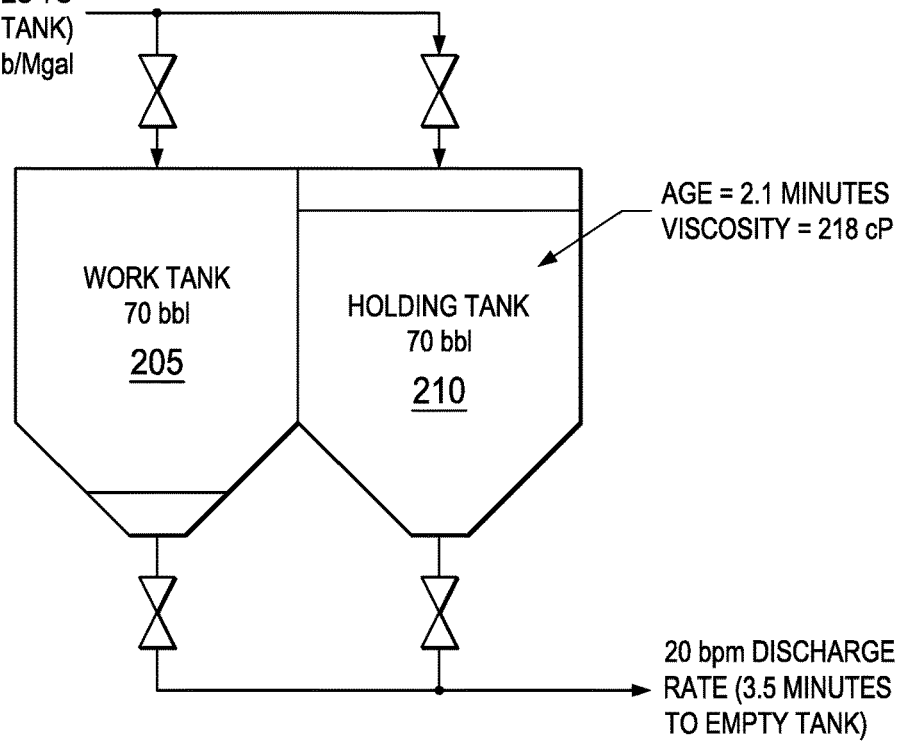
FIG. 4 illustrates an example of the proposed continuous batch hydration process.

This example, (shown in FIG. 4) is based on a gel, which was the same as used in the comparative example. The gel was allowed to age in a hydration tank 210 to produce a hydrated gel. In one hypothetical operation, the hydrated gel could be allowed to age in hydration tank 210 (holding tank before being discharged. It is believed that this residence time would decrease the viscosity differential between new and old hydrated gel in the work tank (215) and, in turn, increase the plug flow efficiency of the system. Given a 70 bbl. hydration tank 205 (work tank) filled at a rate of 50 bpm, the tank would fill in 1.4 minutes. Given a rate of 20 bpm, the work tank 205 could be emptied in 3.5 minutes. Once the work tank 205 is emptied, holding tank 210 would become the work tank. The oldest gel, when hydration tank 210 is switched from being the holding tank to the working tank, could age 3.5 minutes and the youngest hydrated gel could age 2.1 minutes. Referring to FIG. 6, the old hydrated gel would reach 90% of the final viscosity (250 CP) and the youngest hydrated gel would reach 78% of the final viscosity (218 cP). The differential in viscosity between entering and exiting hydrated gel would then be approximately 30 cP. Given these calculations, it is believed that the hydrated gel would flow from the tank in an improved FIFO manner, since the viscosity differential was low. The data shown in Table II, below is based on the hydration curve shown in FIG. 6 and times were calculated from the stated tank volumes and stated fluid rates:

TABLE II

| | |
|---|---|
| Work Tank Volume | 70 bbl |
| Holding Tank Volume | 70 bbl |
| Gel Concentration | 120 lb/Mgal |
| Fill Rate | 50 bpm |
| Discharge Rate | 20 bpm |

TABLE II-continued

| | |
|---|---|
| Fluid Age Before Discharging From Tank | 2.1 to 3.5 minutes |
| Young Fluid Viscosity (2.1 minutes) | 218 cP |
| Aged Fluid Viscosity (3.5 minutes) | 250 cP |
| Viscosity Differential | ~32 cP |

Example 2: Proposed Continuous Batch Hydration Process

Figure 5:
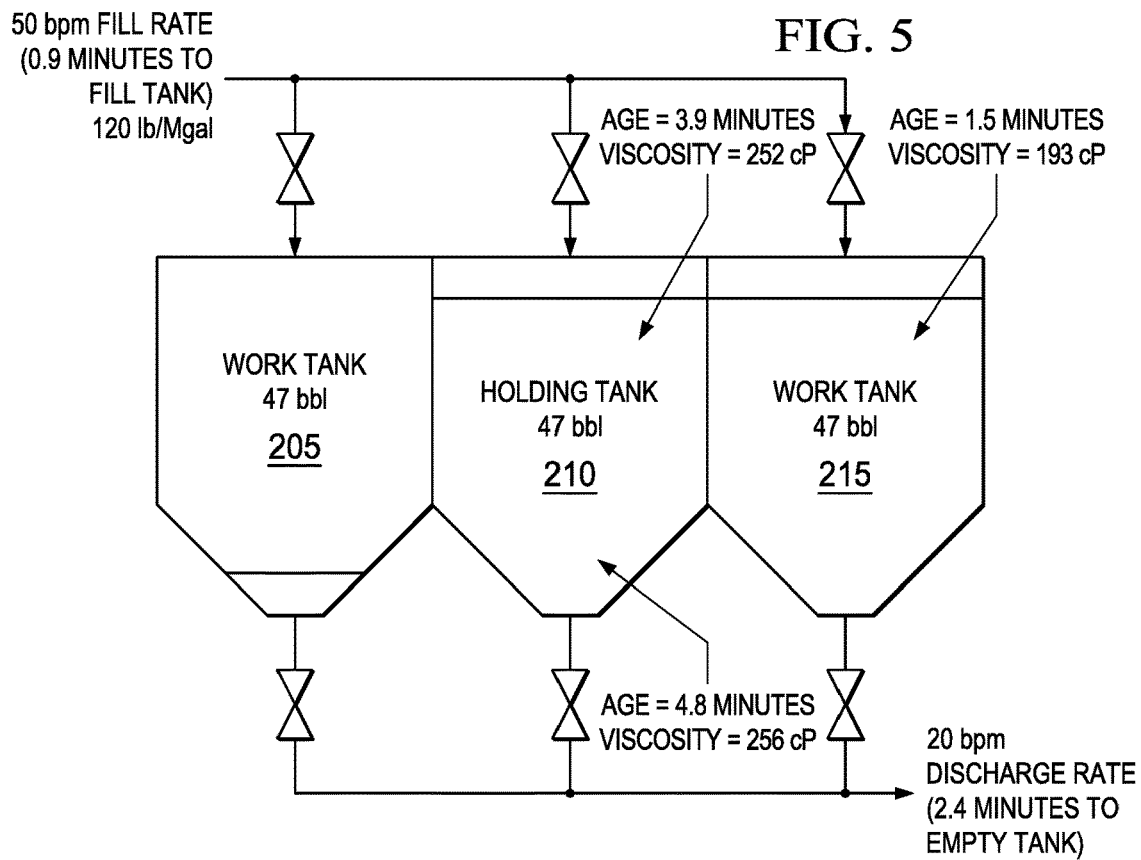
FIG. 5 illustrates another example of the proposed continuous batch hydration process.

In this example, (shown in FIG. 5) the same gel that was used in the previous examples was used to produce a hydrated gel. This hypothetical example is similar to Example 1, however, a third tank would be added to the system while keeping the total tank volume constant at 140 bbls. Fill and discharge rates would remain unchanged at 50 bpm and 20 bpm, respectively. Based on the stated discharge and fill rates, the work tank would empty in 2.4 minutes and the holding tank would fill in 0.9 minutes. The oldest hydrated gel when the tank switches from being the second holding tank to the work tank would age 4.9 minutes, and the youngest hydrated gel would age 3.9 minutes. Referring to FIG. 6, the old gel would reach 92% of the final viscosity (256 cP), and the youngest hydrated gel would reach 90% of the final viscosity (252 cP). The difference in viscosity between entering and exiting hydrated gel would then be approximately 4 cP. This hypothetical example illustrates that when the total tank volume is held constant but subdivided into more, smaller tank volumes, the holding time can be increased. It is believed that as more tanks are added, the hold time will approach that of a single tank operating at 100 FIFO efficiency. The data shown in Table III, below is based on the hydration curve shown in FIG. 6 and times were calculated from the stated tank volumes and stated fluid rates:

TABLE III

| | |
|---|---|
| Work Tank Volume | 47 bbl |
| Holding Tank Volume | 94 bbl |
| Gel Concentration | 120 lb/Mgal |
| Fill Rate | 50 bpm |
| Discharge Rate | 20 bpm |
| Fluid Age Before Discharging From Tank | 3.9 to 4.8 minutes |
| Young Fluid Viscosity (2.1 minutes) | 252 cP |
| Aged Fluid Viscosity (3.5 minutes) | 256 cP |
| Viscosity Differential | ~4 cP |

Based on the foregoing observations, it can be seen that embodiments of the hydration process as provided herein provide a number of advantages over current continuous hydration process. For example, the embodiments of this disclosure provide for a more consistent hydration process in that the total viscosity of combined younger gel and older gel results in a lower viscosity differential. Additionally, the fill rates can be increased, thereby allowing more residence time of the first-in gel in the hydration tank. The presence of multiple tanks provide a gel that is closer to being fully or 100% hydrated. Further, certain embodiments provide a system that allows the gel mixer to be cleaned while still delivering a hydrated gel having improved hydration and viscosity.

Embodiments herein comprise:

A gel hydration apparatus, comprising hydration tanks, each having an interior volume, wherein the interior volumes are isolated from one another. A hydrated gel supply system is fluidly connected to the hydration tanks by a conduit system, and a plurality of fluid valves are interposed the conduit system. A controller is operatively connected to the plurality of fluid valves and is configured to provide commands to the plurality of fluid valves to fill a first of the hydration tanks with a hydrated gel and empty a second of the hydration tanks of hydrated gel as the first of the hydration tanks is filled.

Another embodiment comprises a well fracing system. This embodiment comprises a first hydration tank having a first interior volume, a second hydration tank having a second interior volume, wherein the second interior volume is isolated from the first interior volume, a water supply tank, a gel mixer, and a gel feeder positioned to empty a gel into the gel mixer. This embodiment further includes a slurry blender system that is couplable to a wellhead. The slurry blender includes a slurry blender pump, and a slurry mixer fluidly couplable to the wellhead. A conduit system fluidly connects the water supply tank and the gel mixer to the first and second hydration tanks and fluidly connects the first and second hydration tanks to the slurry blender system. A fluid bypass conduit system fluidly connects the water supply tank and the gel mixer to the slurry blender system, and fluid valves are interposed the conduit system to control a flow of a gel solution from the gel mixer to the first and second hydration tanks.

Another embodiment comprises a method of preparing a hydrated gel. This embodiment comprises mixing water with a gel in a gel mixer to produce a gel solution and pumping the gel solution through a conduit system to fill a first hydration tank. The gel solution becomes hydrated to form a hydrated gel as the first hydration tank is filled. The gel solution is pumped through the conduit system to fill a second hydration tank, while simultaneously releasing the hydrated gel from the first hydration tank through an outlet thereof that is coupled to an outlet conduit fluidly coupled to a hydrated gel pump.

Each of the foregoing embodiments may comprise one or more of the following additional elements singly or in combination, and neither the example embodiments or the following listed elements limit the disclosure, but are provided as examples of the various embodiments covered by the disclosure:

Element 1: wherein the gel supply system comprises a water tank, a gel mixer, and a gel feeder fluidly coupled to the hydration tanks.

Element 2: wherein the conduit system further comprises an outlet conduit system coupled to respective outlet ends of each of the hydration tanks that have a portion of the plurality of fluid valves interposed the outlet conduit and operatively coupled to the controller to receive commands from the controller to empty a filled hydration tank of the hydration tanks.

Element 3: wherein the conduit system comprises a first pump located between the water tank and the gel mixer.

Element 4: wherein the conduit system comprises a second pump connected to the outlet conduit system.

Element 5: wherein the controller is configured to fill a holding tank of the hydration tanks with a gel solution at a rate greater than a discharge rate of a hydrated gel from a work tank of the hydration tanks.

Element 6: wherein the water tank and the gel mixer are fluidly connectable to a slurry blender system by a bypass conduit that fluidly bypasses said hydration tanks.

Element 7: wherein each of the hydration tanks has filling sensors and emptying sensors located within the volumes and configured to send respective fill or empty signals to the controller.

Element 8: wherein each of the first and second hydration tanks include filling sensors and emptying sensors located within the volumes and configured to send a signal when the first and second hydrations tanks are full or empty, respectively.

Element 9: wherein the conduit system includes a hydrated gel pump connected to respective outlets of the first and second hydration tanks by an outlet fluid conduit system and the is fluidly connected to the slurry blender system.

Element 10: wherein the valves comprises a valve interposed the outlet fluid conduit system and between the outlets of each of the first and second hydration tanks and the hydrated gel pump.

Element 11: further comprising a controller operatively connected to the fluid valves and configured to provide commands to the fluid valves to fill the first hydration tank with a gel solution at a rate greater than a rate at which a hydrated gel solution is emptied from the second hydration tank.

Element 12: wherein pumping the hydrated gel through the conduit system includes pumping the hydrated gel through a plurality of fluid valves, wherein a first one of the plurality of fluid valves controls a fluid flow into the first hydration tank and a second one of the plurality of fluid valves controls a fluid flow out of the first tank, and wherein a third one of the plurality of fluid valves controls a fluid flow into the second hydration tank and a fourth one of the plurality of fluid valves controls a fluid flow out of the second tank.

Element 13: further comprising cleaning the gel mixer of a gel buildup by pumping water from a water tank through the gel mixer when the hydrated gel is not being fed into the gel mixer and transporting the gel buildup through a bypass conduit that bypasses the first and second hydration tanks.

Element 14: wherein mixing, pumping the hydrated gel through a conduit system, pumping the hydrated gel through the conduit system to fill a second hydration tank, while simultaneously releasing the hydrated gel from the first hydration tank are controlled by a controller coupled to a plurality of fluid control valves interposed the conduit system.

Element 15: further comprising, after emptying the filled first hydration tank and filling the second hydration tank, pumping the hydrated gel through the conduit system to fill the first second hydration tank, while simultaneously releasing the hydrated gel from the second hydration tank through an outlet thereof, coupled to the outlet conduit.

Element 16: further comprising filing a third hydration tank with the hydrated gel while discharging the second hydration tank.

Element 17: further comprising emptying the third hydration tank through an outlet thereof.

The foregoing listed embodiments and elements do not limit the disclosure to just those listed above, and those skilled in the art to which this application relates will appreciate that other and further additions, deletions, substitutions and modifications may be made to the described embodiments.

What is claimed is:

1. A continuous batch gel hydration apparatus, comprising:
   at least one holding hydration tank and at least one work hydration tank, each having an interior volume, wherein said interior volumes are isolated from one another;
   a gel supply system fluidly connected to said hydration tanks by a conduit system;

a plurality of fluid valves interposed said conduit system; and a controller operatively connected to said plurality of fluid valves and configured to provide commands to said plurality of fluid valves to:

fill said at least one holding hydration tank with a young gel solution from said gel supply system and discharge said at least one work hydration tank of an aged gel solution as said at least one holding hydration tank is filled with said young gel solution from said gel supply system, wherein said aged gel solution in said at least one work hydration tank has a lower viscosity differential than said young gel solution in said at least one holding hydration tank; and allow said young gel solution in said at least one holding hydration tank to hydrate and age to increase its viscosity before discharging said at least one holding hydration tank, wherein after said at least one work hydration tank has discharged and said young gel has aged in said at least one holding hydration tank, said at least one holding hydration tank becomes said at least one work hydration tank and said at least one work hydration tank becomes said at least one holding hydration tank.

2. The apparatus of claim 1, wherein said gel supply system comprises a water tank, a gel mixer, and a gel feeder fluidly coupled to said hydration tanks.

3. The apparatus of claim 2, wherein said conduit system comprises a first pump located between said water tank and said gel mixer.

4. The apparatus of claim 2, wherein said water tank and said gel mixer are fluidly connectable to a slurry blender system by a bypass conduit that fluidly bypasses said hydration tanks.

5. The apparatus of claim 1, wherein said conduit system further comprises an outlet conduit system coupled to respective outlet ends of each of said hydration tanks that have a portion of said plurality of fluid valves interposed said outlet conduit and operatively coupled to said controller to receive commands from said controller to discharge a filled work hydration tank of said aged gel solution.

6. The apparatus of claim 5, wherein said conduit system comprises a pump connected to said outlet conduit system.

7. The apparatus of claim 1, wherein said controller is configured to fill said at least one holding hydration tank with said young gel solution at a rate greater than said aged gel is discharged from said at least one work hydration tank.

8. The apparatus of claim 1, wherein each of said hydration tanks has filling sensors and emptying sensors located within said volumes and configured to send respective fill or empty signals to said controller.

9. A well fracing system for continuous batch gel hydration, comprising:

at least one hydration tank having a first interior volume;

at least one hydration tank having a second interior volume, wherein said second interior volume is isolated from said first interior volume;

a water supply tank;

a gel mixer;

a gel feeder positioned to empty a gel into said gel mixer;

a slurry blender system couplable to a wellhead, and including a slurry blender pump and slurry mixer fluidly couplable to said wellhead;

a conduit system that fluidly connects said water supply tank and said gel mixer to said at least one holding and at least one work hydration tanks and fluidly connects said at least one holding and at least one work hydration tanks to said slurry blender system;

a fluid bypass conduit system that fluidly connects said water supply tank and said gel mixer to said slurry blender system;

a plurality of fluid valves interposed said conduit system to control a flow of a gel solution from said gel mixer to said at least one holding and at least one work hydration tanks; and a controller operatively connected to said plurality of fluid valves and configured to provide commands to said plurality of fluid valves to:

fill said at least one holding hydration tank with a young gel solution from said gel mixer and discharge said at least one work hydration tank of an aged gel solution as said at least one holding hydration tank is filled with said young gel solution from said gel mixer, wherein said aged gel solution in said at least one work hydration tank has a lower viscosity differential than said young gel in said at least one holding hydration tank; and allow said young gel solution in said at least one holding hydration tank to hydrate and age to increase its viscosity before discharging said at least one holding hydration tank, wherein after said at least one work hydration tank has discharged and said young gel has aged in said at least one holding hydration tank, said at least one holding hydration tank becomes said at least one work hydration tank and said at least one work hydration tank becomes said at least one holding hydration tank.

10. The system of claim 9, wherein each of said at least one holding and work hydration tanks include filling sensors and emptying sensors located within said volumes and configured to send a signal when said at least one holding and work hydrations tanks are full or empty, respectively.

11. The system of claim 9, wherein said conduit system includes a hydrated gel pump connected to respective outlets of each of said at least one holding and work hydration tanks by an outlet fluid conduit system, and wherein said hydrated gel pump is fluidly connected to said slurry blender system.

12. The system of claim 11 wherein said plurality of fluid valves comprises a valve interposed said outlet conduit system and between said outlets of each of said at least one holding and work hydration tanks and said hydrated gel pump.

13. The system of claim 9, wherein said controller is operatively connected to said plurality of fluid valves and configured to provide commands to said fluid valves to fill said at least one holding hydration tank with said young gel solution at a rate greater than said aged gel solution is discharged from said at least one work hydration tank.

14. A method of preparing a hydrated fracing gel in a continuous batch process, comprising:

mixing water with a gel in a gel mixer to produce a gel solution;

filling at least one holding hydration tank with a young gel solution and discharging at least one work hydration tank of an aged gel solution as said at least one holding hydration tank is filled with said young gel solution, wherein said aged gel solution in said at least one work hydration tank has a lower viscosity differential than said young gel in said at least one holding hydration tank; and allowing said young gel solution in said at least one holding hydration tank to hydrate and age to increase its viscosity before discharging said at least one holding hydration tank, wherein after said at least one work hydration tank has discharged and said young gel has aged in said at least one holding hydration tank, said at least one holding hydration tank becomes said at least one work hydration tank and said at least one work hydration tank becomes said at least one holding hydration tank.

15. The method of claim 14, wherein a plurality of fluid valves of a conduit system controls a flow of said gel solution into and out of said at least one holding and work hydration tanks.

16. The method of claim 14, further comprising cleaning said gel mixer of a gel buildup by pumping water from a water tank through said gel mixer when said gel is not being fed into said gel mixer and transporting said gel buildup through a bypass conduit that bypasses said at least one holding and work hydration tanks.

17. The method of claim 14, wherein said filling, discharging, and allowing are controlled by a controller coupled to a plurality of fluid control valves interposed in a conduit system.

18. The method of claim 14, wherein said at least one holding hydration tank is filled with said young gel solution faster than said aged gel solution is discharged from said at least one work tank.

19. The method of claim 14, further comprising filling a second holding hydration tank with said young gel while discharging said at least one work hydration tank.

20. The method of claim 14 further comprising discharging said second holding hydration tank through an outlet thereof.

\* \* \* \* \*

UNITED STATES PATENT AND TRADEMARK OFFICE
CERTIFICATE OF CORRECTION

PATENT NO. : 10,641,075 B2
APPLICATION NO. : 16/318593
DATED : May 5, 2020
INVENTOR(S) : Bryan Chapman Lucas, Chad Adam Fisher and Wesley John Warren It is certified that error appears in the above-identified patent and that said Letters Patent is hereby corrected as shown below:

In the Specification

In Column 2, Line 22, after --hydrated-- delete "get" and insert --gel--

In Column 12, Line 9, after --and-- delete "the"

Signed and Sealed this
Seventh Day of July, 2020

Andrei Iancu
*Director of the United States Patent and Trademark Office*